United States Patent
Morford et al.

(10) Patent No.: US 8,489,720 B1
(45) Date of Patent: Jul. 16, 2013

(54) COST-AWARE, BANDWIDTH MANAGEMENT SYSTEMS ADAPTIVE TO NETWORK CONDITIONS

(75) Inventors: Michael Robert Morford, Saratoga, CA (US); Robert E. Purvy, San Jose, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1767 days.

(21) Appl. No.: 10/816,512

(22) Filed: Mar. 31, 2004

(51) Int. Cl.
*G06F 15/173* (2006.01)
*G06F 15/16* (2006.01)

(52) U.S. Cl.
USPC ............ 709/223; 709/225; 709/232; 709/233

(58) Field of Classification Search
USPC .................. 709/225, 232–235; 370/229, 230, 370/230.1, 231–235, 238, 395.21
See application file for complete search history.

(56) References Cited

U.S. PATENT DOCUMENTS

| | | | | |
|---|---|---|---|---|
| 6,084,858 A * | 7/2000 | Matthews et al. | ............ | 370/238 |
| 6,421,323 B1 * | 7/2002 | Nelson et al. | ................ | 370/249 |
| 6,684,255 B1 * | 1/2004 | Martin | .......................... | 709/231 |
| 6,850,965 B2 * | 2/2005 | Allen | ............................ | 709/203 |
| 7,002,914 B2 * | 2/2006 | Cloonan | ....................... | 370/232 |
| 7,257,560 B2 * | 8/2007 | Jacobs et al. | ................. | 705/400 |
| 7,343,337 B1 * | 3/2008 | Cieliebak et al. | ........... | 705/36 R |
| 2002/0009051 A1 * | 1/2002 | Cloonan | ....................... | 370/232 |
| 2002/0029274 A1 * | 3/2002 | Allen | ............................. | 709/226 |
| 2002/0105911 A1 * | 8/2002 | Pruthi et al. | ................... | 370/241 |
| 2002/0178274 A1 * | 11/2002 | Kovacevic | .................... | 709/231 |
| 2003/0005112 A1 * | 1/2003 | Krautkremer | ................. | 709/224 |
| 2003/0097461 A1 * | 5/2003 | Barham et al. | ................ | 709/235 |
| 2004/0030797 A1 * | 2/2004 | Akinlar et al. | ................ | 709/232 |
| 2004/0205098 A1 * | 10/2004 | Lloyd et al. | ................... | 709/200 |
| 2005/0027548 A1 * | 2/2005 | Jacobs et al. | ...................... | 705/1 |
| 2005/0120131 A1 * | 6/2005 | Allen | ............................ | 709/233 |
| 2007/0100776 A1 * | 5/2007 | Shah et al. | ..................... | 705/400 |
| 2008/0015914 A1 * | 1/2008 | Jacobs et al. | ...................... | 705/7 |

* cited by examiner

*Primary Examiner* — Umar Cheema
(74) *Attorney, Agent, or Firm* — Baker Botts L.L.P.

(57) ABSTRACT

Methods, apparatuses, and systems directed to cost-aware bandwidth management schemes that are adaptive to monitored network or application performance attributes. In one embodiment, the present invention supports bandwidth management systems that adapt to network conditions, while managing tradeoffs between bandwidth costs and application performance. One implementation of the present invention tracks bandwidth usage over an applicable billing period and applies a statistical model to allow for bursting to address increased network loading conditions that degrade network or application performance. One implementation allows for bursting at selected time periods based on computations minimizing cost relative to an applicable billing model. One implementation of the present invention is also application-aware, monitoring network application performance and increasing bandwidth allocations in response to degradations in the performance of selected applications.

20 Claims, 6 Drawing Sheets

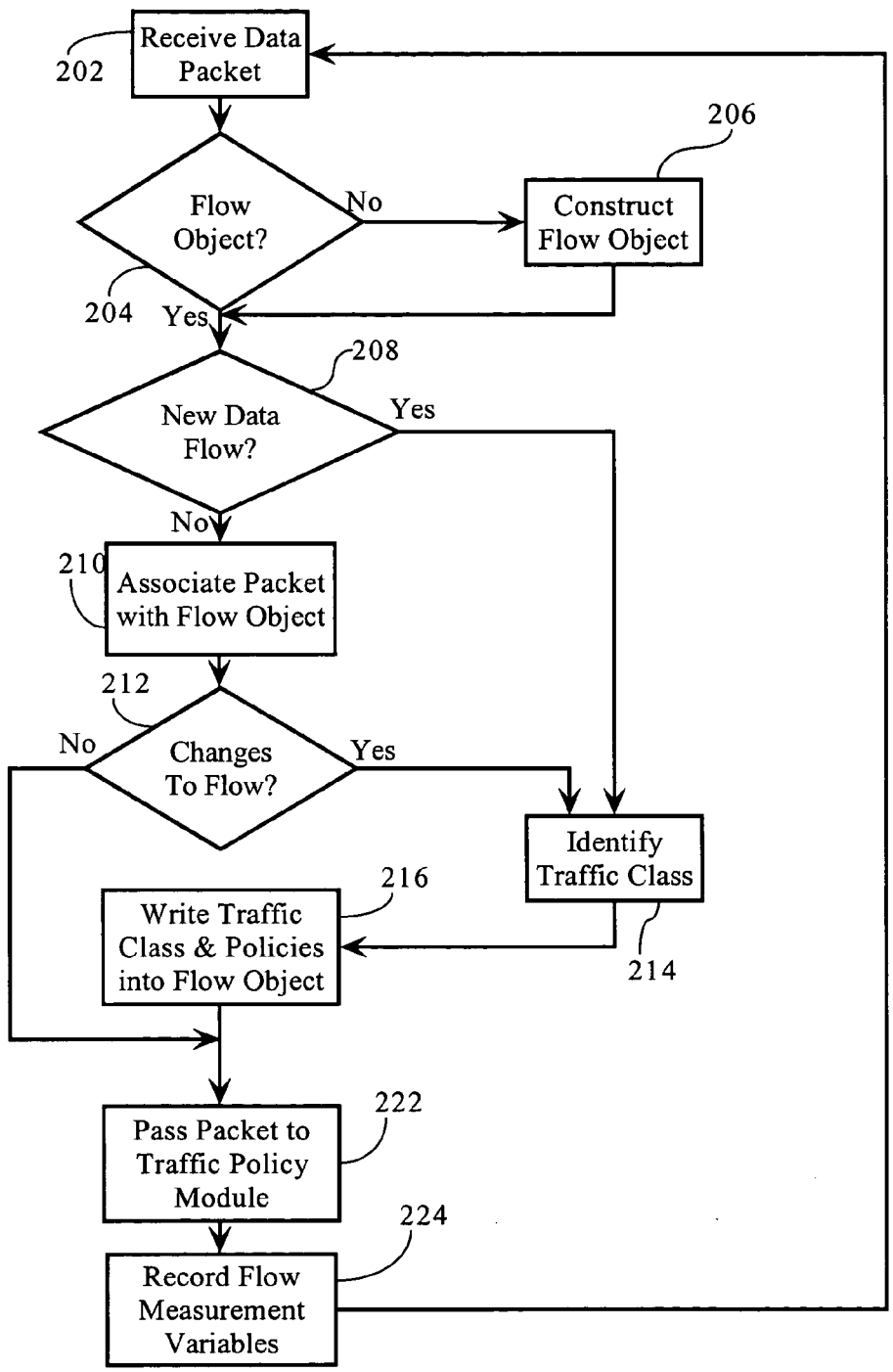
Fig._4

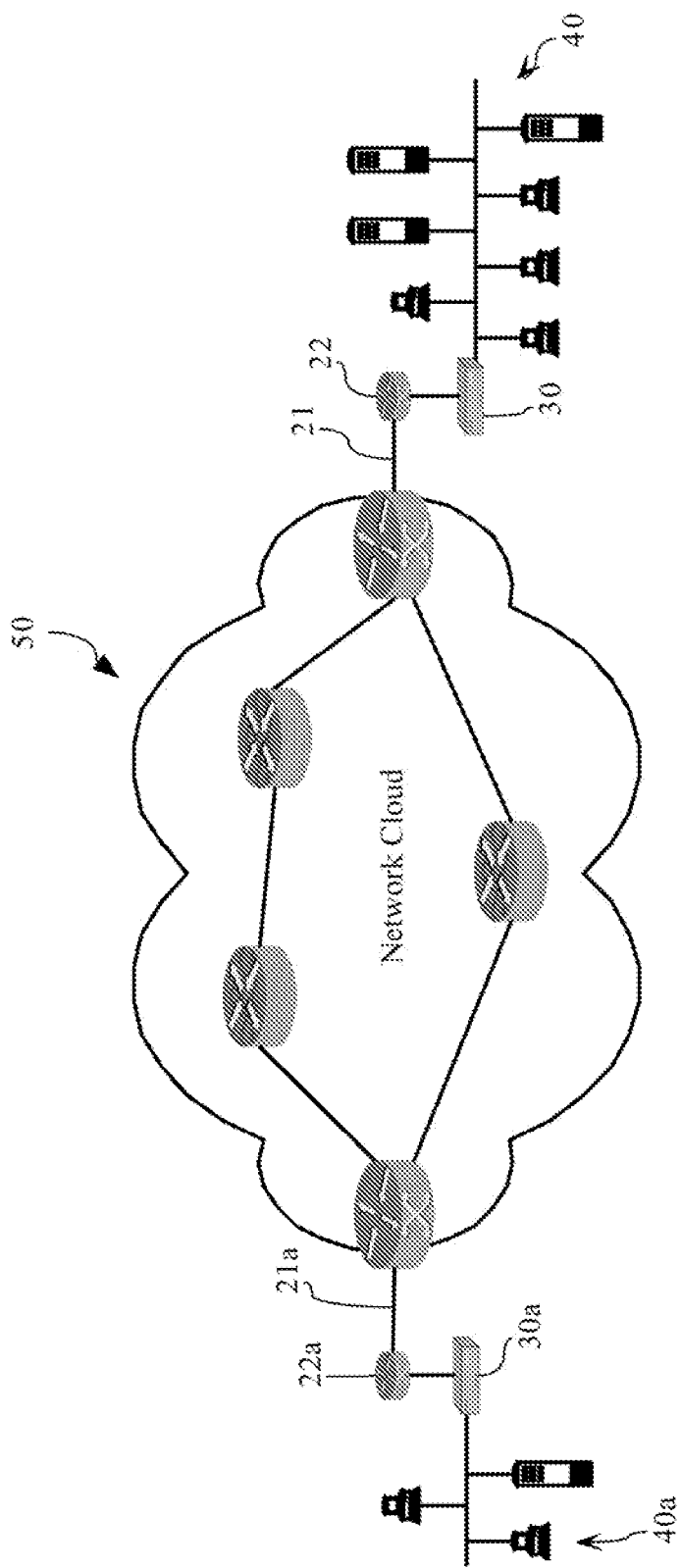
Fig._5

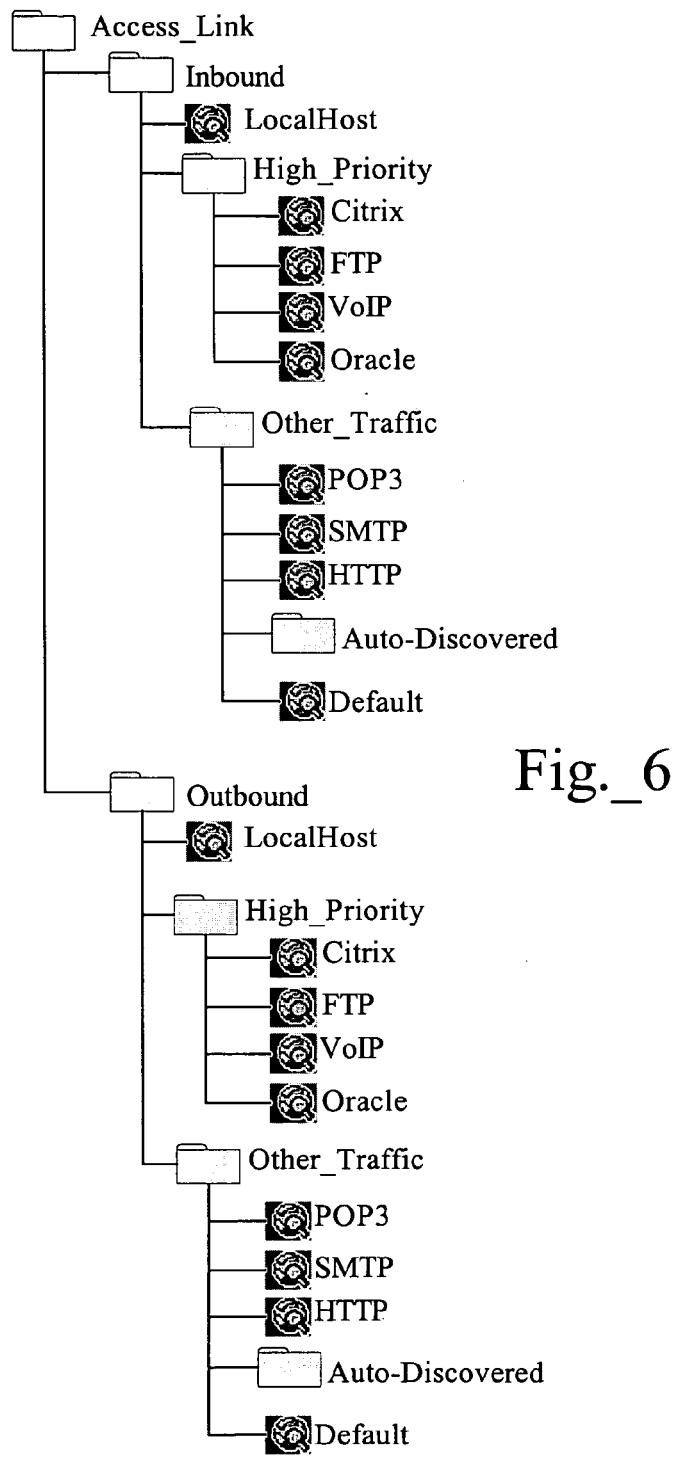
Fig._6

COST-AWARE, BANDWIDTH MANAGEMENT SYSTEMS ADAPTIVE TO NETWORK CONDITIONS

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism;" and U.S. patent application Ser. No. 10/676,632, in the name of Roopesh Varier, Guy Riddle, and David Jacobson, entitled "Dynamic Bandwidth Management Responsive to Access Link State in Redundant Network Topologies."

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to network bandwidth management systems and, more particularly, to cost-aware, performance-based bandwidth management schemes that are adaptive to monitored network or application performance attributes.

BACKGROUND OF THE INVENTION

Enterprises have become increasingly dependent on computer network infrastructures to provide services and accomplish mission-critical tasks. Indeed, the performance and efficiency of these network infrastructures have become critical as enterprises increase their reliance on distributed computing environments and wide area computer networks. The widely-used TCP/IP protocol suite, which is implemented widely throughout the world-wide data communications network environment called the Internet and many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

Enterprises network topologies can span a vast array of designs and connection schemes depending on the enterprise's resource requirements, desired service levels, costs and the like. Enterprise network design topologies often include an array of access links interconnecting LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service providers public network or the Internet. Some enterprises also use VPN technology to create extranets with customers, suppliers, and vendors. Naturally, the cost of the access links and network infrastructures that interconnect enterprise networks and systems is an ever-growing concern.

Indeed, due to concerns over the cost of network bandwidth, the capacity of the access links that interconnect a given enterprise's WAN segments, as well as the access links connecting the enterprise WAN, often exceed a given enterprise's usage of that access link. For example, the costs often charged to a given enterprise for a given access link are based on usage. For example, many larger access links (e.g., Internet T1s, T3s) are billed according to a tiered rate structure based on a computed bandwidth consumption average. For example, while a given access link may support a transmission rate of 45 Megabits-per-second (Mbps), average bandwidth consumption over a month may be far less than this maximum rate. For example, an enterprise that consumes on average 6 Mbps over a given month is charged according to an applicable rate, while higher rates apply to larger average consumption values. According to one typical billing model, an Internet Service Provider may compute bandwidth charges for a given access link by taking the average bandwidth in bits-per-second (bps) in one-minute samples (or at some other sampling interval) over a given month (in both the inbound and outbound directions), discarding the top N percent (e.g., 5 percent) of the samples, and billing based on the highest remaining sampled value. These and similar billing models pose certain problems for enterprises since it is difficult to budget for such variable costs. For example, a single large file transfer during a given billing cycle could result in charges according to a higher rate tier. Accordingly, in these and similar billing models, enterprises sometimes deploy network traffic rate control devices, such as bandwidth or application traffic management systems, to limit bandwidth consumption on a given access link to a maximum bandwidth (e.g., 6 Mbps). In these deployments, as opposed to allowing traffic to burst and consuming the full capacity of the access link, the network traffic management devices prevent bandwidth charges from exceeding a given rate tier. From a performance standpoint, however, this solution is sub-optimal, since it does not allow the enterprise to take advantage of the excess capacity (e.g., bursting capability) of the access link when needed (such as when network application performance suffers due to increased load). In addition, this solution prevents an enterprise from capitalizing on the essentially free bursting capability allowed by the typical billing models, discussed above, which discard a percentage of the highest sample values.

In light of the foregoing, a need in the art exists for methods, apparatuses and systems directed to bandwidth management systems that adapt to network conditions, while managing tradeoffs between bandwidth costs and application performance. Embodiments of the present invention substantially fulfill this need.

SUMMARY OF THE INVENTION

The present invention provides methods, apparatuses, and systems directed to cost-aware bandwidth management schemes that are adaptive to monitored network or application performance attributes. In one embodiment, the present invention supports bandwidth management systems that adapt to network conditions, while managing tradeoffs between bandwidth costs and application performance. One implementation of the present invention tracks bandwidth usage over an applicable billing period and applies a statistical model to allow for bursting to address increased network loading conditions that degrade network or application performance. One implementation allows for bursting at selected time periods based on computations minimizing cost relative to an applicable billing model. One implementation of the present invention is also application-aware, monitoring network application performance and increasing bandwidth allocations in response to degradations in the performance of selected applications.

DESCRIPTION OF THE DRAWINGS

FIG. 4 is a flow chart diagram providing a method, according to an embodiment of the present invention, directed to the enforcement of bandwidth utilization controls on data flows traversing the traffic management device.

FIG. 5 is a schematic diagram of a computer network environment including a differentiated services network, such as a MPLS core network, interconnecting a first network and a second network.

FIG. 6 sets forth an exemplary traffic classification configuration for use in connection with an embodiment of the present invention.

DESCRIPTION OF PREFERRED EMBODIMENT(S)

Figure 1:
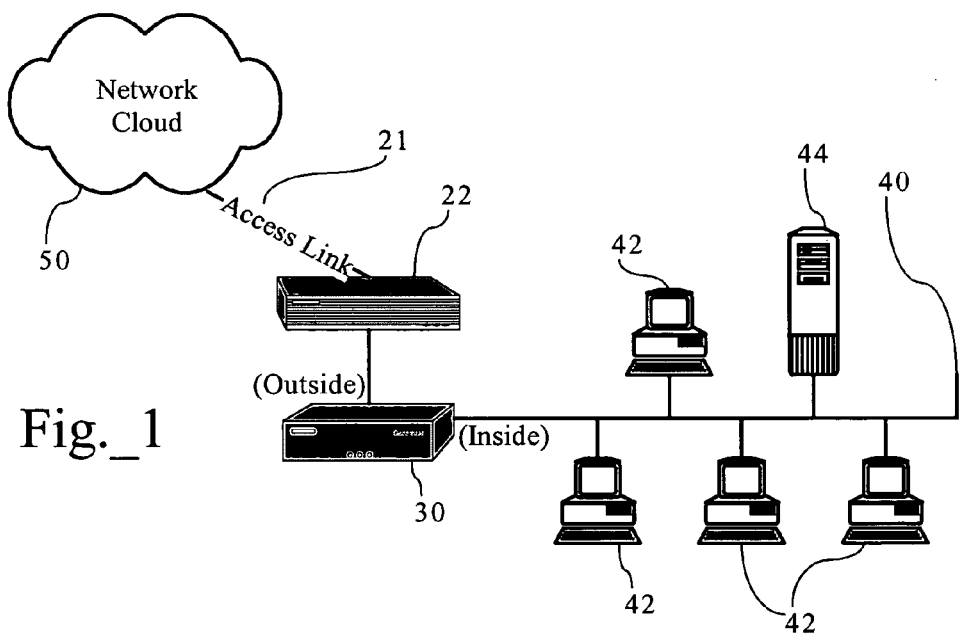
FIG. 1 is a schematic diagram illustrating a computer network including a traffic management device according to an implementation of the present invention.

FIGS. 1 and 5 illustrate general network environments in which embodiments of the present invention operate. As FIG. 1 shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including computer network 40 and network 50 is a packet-based communications environment, employing TCP/IP protocols, and/or other suitable protocols. Both network 40 and 50 include a plurality of interconnected digital packet transmission stations or routing nodes. Network 40 can be a local area network, a wide area network, or any other suitable network. As FIG. 1 also illustrates, traffic management device 30, in one implementation, is deployed at the edge of network 40 to manage data flows traversing access link 21. FIG. 5 illustrates a network 50, such as an internet service provider or carrier network, interconnecting a first enterprise network 40, such as a central operating or headquarters facility, and a second enterprise network 40a, such as a branch office facility. FIG. 5 shows traffic management devices 30, 30a deployed at the edge of respective networks 40, 40a.

The charges or costs associated with access link 21, in one implementation, are based on a billing model that defines applicable charges based on bandwidth utilization over a given interval or billing cycle (e.g., monthly, etc.). In one implementation, the billing model is based on the $95^{th}$ percentile bandwidth utilization value recorded over the applicable billing interval. For example, as discussed above, an internet service provider or network carrier records data throughput at one-minute intervals to determine average bandwidth for each sampling interval, discards the highest 5 percent of the samples, and bases the applicable rate for that billing interval on the remaining highest sample value. In one implementation, the billing rate is determined based on a tiered billing structure including different rates for different, contiguous bandwidth ranges. Of course, other use-based billing models may also be used in connection with the present invention. For example, in another billing model, inbound and outbound bandwidth consumption can be computed and charged on a separate basis.

As discussed more fully below, traffic management device 30 is operative to monitor bandwidth utilization across access link 21 relative to an applicable billing model, and adjust one or more operational parameters to modulate bandwidth limits applied to data flows on an aggregate and/or per-traffic-class basis. In one implementation, traffic management device 30 can be configured to cap bandwidth charges associated with access link 21 to a configured amount, while maximizing network application performance within this desired cost objective. In another implementation, traffic management device 30 can be configured to reduce bandwidth cost, while maintaining acceptable application performance. In another implementation, traffic management device 30 can be configured to optimize the performance of one or more networked applications, while factoring in a desired bandwidth cost objective. Moreover, changes to aggregate bandwidth limits can be based on overall network conditions or performance attributes, or on assessments of performance attributes of selected network applications (such as response times, network delay, packet exchange times, etc.) (see below).

Figure 2:
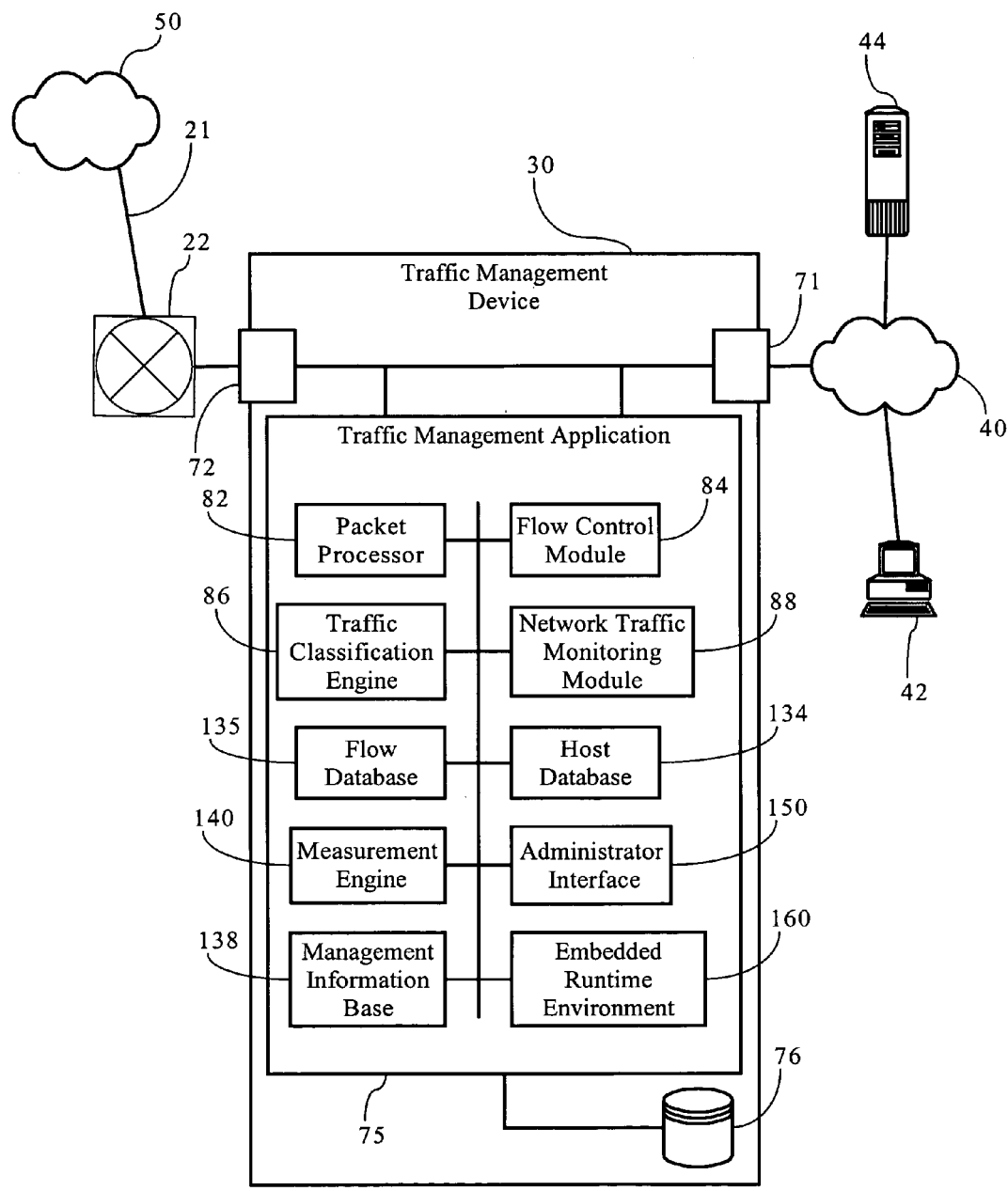
FIG. 2 is a functional block diagram illustrating the functionality of a traffic management device according to an implementation of the present invention.

A variety of deployment configurations are possible. FIG. 2 shows deployment of traffic management device 30 between router 22 and a first network 40 (comprising a hub, switch, router, and/or a variety of combinations of such devices implementing a LAN or WAN) interconnecting two end-systems (here, client computer 42 and server 44). Alternatively, in other implementations, traffic management device 30 may be disposed in the communication path between access link 21 and router 22. In other embodiments, multiple traffic management devices can be disposed at strategic points in a given network infrastructure to achieve various objectives. For example, the traffic management functionality described herein may be deployed in multiple network devices and used in redundant network topologies by integrating the network traffic synchronization functionality described in U.S. patent application Ser. No. 10/611,573, incorporated by reference above. Still further, the present invention can be deployed in a network environment comprising a plurality of redundant access links, conceptually aggregated into a virtual access link for the purposes of billing and administration. U.S. patent application Ser. No. 10/676,632 discloses the aggregation of multiple access links into a single virtual access link. Still further, the traffic management devices 30, 30a shown in FIG. 5 may operate substantially independently, or cooperate to provide an end-to-end system that manages bandwidth costs. For example, assuming that access links 21, 21a are dedicated only to network traffic between networks 40, 40a, traffic management devices 30, 30a can be configured to modulate bandwidth limits only as to outbound data flows. In addition, traffic management devices 30, 30a may be configured to share partition configuration information to coordinate modulation of bandwidth limits applied to access links 21, 21a.

A. Cost-Aware, Adaptive Traffic Management

As discussed above, traffic management device 30, in one implementation, is operative to monitor network bandwidth utilization across an access link relative to a billing model, apply a limit to bandwidth consumption, and modulate the bandwidth limit based on network conditions or application performance and desired cost objectives. As FIG. 2 illustrates, traffic management device 30, in one implementation, comprises traffic management application 75, and first and second network interfaces 71, 72, which operably connect traffic management device 30 to the communications path between first network 40 and router 22. Traffic management application 75 generally refers to the functionality implemented by traffic management device 30. In one embodiment, traffic monitoring module 75 is a combination of hardware and software, such as a central processing unit, memory, a system bus, an operating system and one or more software modules implementing the functionality described herein.

In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic management device 30, in one embodiment, includes persistent memory 76, such as a hard disk drive or other suitable memory device, such writable CD, DVD, or tape drives. Traffic management device 30 can include additional network interfaces to support additional access links or other functionality.

As FIG. 2 illustrates, traffic management application 75, in one implementation, includes a packet processor 82, flow control module 84, traffic classification engine 86, and network traffic monitoring module 88. Traffic management application 75, in one implementation, further comprises host database 134, flow database 135, measurement engine 140, management information base 138, administrator interface 150, and embedded runtime environment 160. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the data flows. The traffic classification engine 86, as discussed more fully below, is operative to classify data flows based on one or more attributes associated with the data flows. Traffic classification engine 86, in one implementation, stores traffic classes associated with data flows encountered during operation of traffic management device 30, as well as manually created traffic classes configured by a network administrator, in a hierarchical traffic class structure. In one embodiment, traffic classification engine 86 stores traffic classes, in association with pointers to traffic management policies or pointers to data structures defining such traffic management policies. In one implementation, flow control module 84 is operative to apply an aggregate bandwidth limit to data flows traversing the access link 21 in the inbound and/or outbound directions. In one implementation, flow control module 84 is further operative to apply one or more traffic management policies to data flows based on the traffic classes associated with the data flows.

Network traffic monitoring module 88 is operative to monitor bandwidth utilization across access link 21 relative to an applicable billing model. In addition, network traffic monitoring module 88, in one implementation, is further operative to monitor the conditions associated with, and/or the performance of, network 50 in the aggregate and/or relative to one or more traffic classes. For example, traffic monitoring module 88 can be configured to monitor the performance of a given network application, such as Citrix®, Oracle® database appplications, and the like in relation to one or more performance attributes. As discussed in more detail below, the performance of a given network application or the overall network, as well as bandwidth utilization computed by network traffic monitoring module 88, can be used to determine whether and to what extent to modulate the aggregate bandwidth limit applied to network traffic traversing access link 21.

As discussed above, in one implementation, traffic management application 75 further comprises measurement engine 140, management information base (MIB) 138, and administrator interface 150. Management information base 138 is a database of standard and extended network objects related to the operation of traffic management device 30. Measurement engine 140 maintains measurement data relating to operation of traffic management device 30 to allow for monitoring of bandwidth utilization and network performance across access link 21 with respect to a plurality of bandwidth utilization and other network statistics on an aggregate and/or per-traffic-class level.

Administrator interface 150 facilitates the configuration of traffic management device 30 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. For example, administrator interface 150 also allows a network administrator to configure traffic management device 30 with a billing model that applies to access link 21, and to set a desired cost limit or objective. Administrator interface 150 can provide a command line interface or a graphical user interface accessible, for example, through a conventional browser on client device 42.

A.1. Packet Processing

As discussed above, packet processor 82, in one implementation, is operative to detect new data flows, instantiate data structures or objects associated with the flows and parse packets to populate one or more fields in the data structures. In one embodiment, when packet processor 82 encounters a new data flow it stores the source and destination IP addresses contained in the packet headers in host database 134. Packet processor 82 further constructs a control block (flow) object including attributes characterizing a specific flow between two end systems. In one embodiment, packet processor 82 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 82, in one embodiment, reserves memory space in the dynamic memory pool for storing such variably-sized attribute information as flows traverse traffic management device 30. Packet processor 82 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 1 illustrates the concept associated with inside and outside addresses. As discussed above, in one embodiment, a flow specification object includes an "inside" and "outside" address relative to traffic management device 30. See FIG. 1. For a TCP/IP packet, packet processor 82 can compute the inside and outside addresses based on the source and destination network addresses of the packet and the direction of the packet flow.

In one embodiment, packet processor 82 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 82 hashes the values identified above and scans the hash table for a matching entry. If one exists, packet processor 82 associates the pointer to the corresponding control block object with the data flow.

To allow for identification of service types (e.g., FTP, HTTP, etc.), packet processor 82, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate(if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When traffic management device 30 encounters a new flow, packet processor 82 analyzes the data flow against the service attributes in the services table to identify a service ID corresponding to the flow. In one embodiment, packet processor 82 may identify more than one service ID associated with the flow. In this instance, packet processor 82 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 82 associates the flow with the most specific service ID. A traffic class maintained by traffic classification engine 86 may be configured to include matching rules based on the service IDs in the services table. For example, a matching rule directed to HTTP traffic may simply refer to the corresponding service ID, as opposed to the individual attributes that packet processor 82 uses to initially identify the service.

In one embodiment, when packet processor 82 inspects a flow it may detect information relating to a second, subsequent flow (e.g., an initial FTP command connection being the harbinger of a subsequent data connection, etc.). Packet processor 82, in response to such flows populates a remembrance table with attributes gleaned from the first flow, such as IP addresses of the connection end points, port numbers, and the like. Packet processor 82 scans attributes of subsequent flows against the remembrance table to potentially associate the subsequent flow with the first flow and to assist in identification of the second flow.

A.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, traffic management device 30 includes functionality allowing for classification of network traffic based on information from layers 2 to 7 of the OSI reference model. Traffic management device 30 can be configured to include matching rules that define a plurality of network applications commonly found in enterprise networks, such as database applications, Citrix® flows, ERP applications, and the like.

In one embodiment, traffic management device 30 is configured to include a predefined set of traffic classes based upon a knowledge base gleaned from observation of common or known traffic types on current networks. Traffic management device 30, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 86 also stores traffic classes added by the traffic discovery module. Furthermore, as discussed below, traffic management device 30 may also include traffic class discovery functionality that automatically adds traffic classes to traffic classification engine 86 in response to data flows traversing the device.

Traffic classification engine 86, in one implementation, stores traffic classes associated with data flows that traverse access link 21. Traffic classification engine 86, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

As FIG. 6 illustrates, in one embodiment, the root traffic classifications are "/Inbound" and "/Outbound" data flows. Any data flow not explicitly classified is classified as "/Inbound/Default" or "/Outbound/Default". The "LocalHost" traffic class corresponds to data flows destined for traffic management device 30, such as requests for stored measurement data or device configuration changes. In one embodiment, traffic classification engine 86 attempts to match to a leaf traffic class node before proceeding to remaining traffic class nodes in the hierarchical configuration. If a traffic class is found, the traffic classification engine 86 stops the instant search process and returns the identified traffic classification. Of course, one skilled in the art will recognize that alternative ways for traversing the hierarchical traffic class configuration can be implemented. For example, traffic classification engine 86 may be configured to traverse all traffic class nodes at a given level before proceeding to lower levels of the traffic classification tree. If more than one traffic class matches the data flow, traffic classification engine 86 can be configured with rules or other logic to select from one of the matching traffic classes.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Traffic management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 86 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

FIG. 6 illustrates a traffic classification configuration according to one implementation of the present invention. As FIG. 6 shows, a "High_Priority" traffic class is configured as a child traffic class of the root /Inbound and /Outbound traffic classes. A network administrator may then configure high priority traffic classes, such as Citrix and FTP traffic, as child traffic classes. In one implementation, this traffic classification configuration allows a network administrator to designate which traffic classes can take advantage of the bursting capability of access link, when permitted, as discussed more fully below.

A.2.a. Automatic Traffic Classification

In one implementation, a traffic discovery module (not shown) analyzes data flows for which no matching traffic class was found in traffic classification engine 86. The traffic discovery module, in one embodiment, is operative to apply predefined sets of matching rules to identify a traffic class corresponding to non-matching data flows. In one implementation, traffic discovery module operates on data flows classified as either /Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing traffic management device 30 and stores such traffic classes in traffic classification engine 86. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 86. In one embodiment, auto-discovered traffic classes are automatically assigned predefined traffic management policies. U.S. patent application Ser. No. 09/198,051, incorporated by reference herein, discloses automatic assignment of traffic policies for discovered traffic classes.

A.3. Flow Control Module

As discussed above, flow control module 84 enforces bandwidth utilization controls (and, in some embodiments, other policies) on data flows traversing access link 21. As discussed above, flow control module 84 is operative to apply an aggregate bandwidth limit on outbound and inbound data flows traversing access link 21. In addition, within this overall bandwidth limit, flow control module 84 applies traffic policies identified in the control block object corresponding to various data flows. A bandwidth utilization control for a particular data flow can comprise an aggregate bandwidth utilization control, a per-flow bandwidth utilization control, or a combination of the two. Flow control module 132 can use any suitable functionality to enforce the aggregate bandwidth limit, as well as other bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

Traffic management device 30, in one embodiment, maintains certain parameter values relating to the outbound (available_outbound_capacity) and inbound capacity (available_inbound_capacity) of access link 21, as well as virtual bandwidth limits (configured_outbound_limit Et configured_ inbound_limit) configured by a user. The outbound and inbound capacity parameters indicate the absolute capacity of the access link (such as 45 Mbps). The virtual bandwidth limits are bandwidth caps (specified by a user) enforced by flow control module 84 to control the utilization charges associated with access link 21. In one implementation, traffic management device 30 maintains "Access Set" variables, outbound_access_bps and inbound_access_bps, which define the Outbound and Inbound Partition sizes actually used in connection with computing rate control and other bandwidth management parameters by flow control module 84. For example, if a child traffic class of the root /Inbound traffic class is configured with a partition that is allowed to burst, in one implementation, it may burst up to the current bandwidth cap associated with the root /Inbound partition. The Access Set variables are initially derived from the bandwidth limits (configured_outbound_limit Ft configured_inbound_limit) configured by a network administrator or other user. Typically, a network administrator will specify default inbound and outbound bandwidth limits based on the billing model applicable to access link 21 and a desired cost objective. For example, if the cost objective limits bandwidth consumption to a rate tier applicable up to 6 Mpbs, the network administrator will set the configured_outbound_limit and configured_inbound_limit parameters to 6 Mbps. In another implementation, traffic management device 30 automatically sets the bandwidth limits after it receives the applicable billing model and cost objective parameters.

Upon initialization of bandwidth management device 30, the outbound_access_bps variable is set to configured_outbound_limit variable, while the inbound_access_bps variable is set to configured_inbound_limit variable. As discussed more fully below, however, the traffic management device 30 adjusts the values of outbound_access_bps and inbound_access_bps in response to loading conditions detected across access link 21, as well as cost and application performance considerations. As discussed below, in other implementations, the parameters defining partitions associated with child traffic classes of the root /inbound and /outbound traffic classes may be adjusted in lieu of, or in addition, to the outbound_access_bps and inbound_access_bps values. For example, the root /inbound and /outbound partitions may be set to the available capacity of the access link, while the child partitions in the aggregate may be limited to the configured_outbound_limit and configured_inbound_limit values. When a bursting condition is met, the /High_Priority partition, for example, may be configured to burst up to available capacity for a period of time before being reset to a default limit.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

As discussed above, FIG. 6 illustrates a traffic classification configuration, according to one implementation of the present invention. As FIG. 6 illustrates, network traffic classes are segregated into two main groups: 1) high priority traffic, and 2) other traffic. In one implementation, a partition hierarchy is also configured. For example, in one implementation, a partition can be created for the root /Inbound traffic class, wherein the maximum bandwidth is capped at 6 Mbps (or another bandwidth limit intended to achieve a desired cost objective). This root partition may then be divided into two partitions corresponding to the /High_Priority and /Other_Traffic traffic classes. In one implementation, one or both of these partitions can be configured to burst up to the overall bandwidth limit of the parent /Inbound partition. A similar partition configuration can be applied for outbound data flows. As discussed more fully below, the partition parameters can be adjusted in response to network conditions and the monitored cost usage of access link. A variety of implementations are possible, for example, the /Inbound and /Outbound partitions may be set to the available capacity of the access link 21, while the child partitions may be capped in the aggregate to a desired bandwidth limit. Traffic management device 30 may then adjust the parameters of the /High_Priority partition to allow for bursting up to available capacity or some other specified value.

A.3.b. Per-Flow Bandwidth Utilization Controls

Flow control module 84 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 84 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 84 to discard or drop data packets or flows associated with a particular traffic class. Other policy types include redirection policies where an inbound request designating a particular resource, for example, is redirected to another server.

A.4. Measurement Engine and Management Information Base

As discussed above, measurement engine 140 maintains data associated with the operation of traffic management device 30 and the computer network environment, including data allowing for measurement of bandwidth utilization across access link 21 with respect to a plurality of bandwidth utilization and other network statistics. The information obtained by these modules may be used in the analysis of network application performance, discussed below. In one implementation, measurement engine 140 is operative to record or maintain numeric totals of a particular measurement variable at periodic intervals on a traffic classification basis. For example, measurement engine 140 monitors the number of inbound and outbound packets, the number of flows, peak and average rates, as well as the number of bytes, traversing traffic management device 30 on an aggregate (access link), partition, and/or traffic class level. Other network statistics can include the number of TCP packets, the number of retransmitted TCP packets, the peak number of concurrently active TCP flows or other connections, etc. Measurement engine 140 also maintains data relating to operation of traffic management device 30, such as aggregate byte count, aggregate packet count, the TCP data packet count, the TCP retransmit packet count, the TCP tossed retransmit packet count, the peak number of active TCP flows. Measurement engine 140 further maintains data relating to traffic classes, such as, for a given traffic class: the packet count in the traffic class, the TCP data packet count in the class, the TCP retransmit packet count in the class, and the peak number of active TCP flows in the class, as well as a "class hits" count characterizing the number of flows that were matched to a given traffic class. Of course, measurement engine 140 can be configured to record and maintain a variety of network utilization and performance related data.

In one embodiment, measurement engine 140 monitors operation of traffic management device 30 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various traffic classes associated with the current configuration of traffic management device 30. In one embodiment, measurement engine 140 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours. In one embodiment, the time interval at which measurement engine 140 stores network management data in persistent memory is a configurable parameter. Additionally, measurement engine 140 includes APIs allowing other modules to access the raw measurement data. In one embodiment, measurement engine 140 includes APIs and associated functionality that aggregates raw measurement data over specified time intervals (e.g., the last hour, 15 minutes, day, etc.).

Management information base 138 maintains a database of standard and extended network objects maintaining counts and other statistics relating to the operation of traffic management device 30. In one embodiment, the data maintained by management information base 138 can be extracted using Simple Network Management Protocol (SNMP) queries. In one embodiment, management information base 138 is maintained in dynamic memory, such as Random Access Memory. For example, the management information base 138 maintains counts related to the operation of the inside and outside network interfaces associated with the traffic management device 30, such as the number of bytes transmitted from an interface, the number of bytes received on an interface, the number of queued packets, transmission error counts, etc. Management information base 138 also maintains counts related to the operation of different modules (e.g., packet processor 82, flow control module 84, etc.) included in traffic management device 30.

A.5. Monitoring Network or Application Performance

As discussed above, network traffic monitoring module 88 is operative to monitor the packet path in the inbound and outbound directions to gather various measurement data and compute the performance of one or more selected traffic classes. As discussed more fully below, the measured performance of one or more traffic classes can be used to determine in part whether to increase the bandwidth limits for inbound and/or outbound data flows. In a typical configuration, the traffic classes for which performance is monitored generally correspond to network applications that an enterprise deems important or critical. In one implementation, application or network performance is determined relative to response times which is a primary indicator of a user's experience with a network application. In one implementation, network traffic monitoring module 88 is operative to provide performance related statistics like network delay, server delay, and congestion metrics for selected applications or other user-defined traffic classes, such as individual hosts, subnets, and for any transaction-oriented TCP traffic class. Network traffic monitoring module 88 can break down the total observed delay, for each response-time measurement into network delay (time spent in transit) and server delay (time the server used to process the request). The location of traffic management device 30 at strategic points in a given network environment—monitoring all the traffic that passes—facilitates the accurate determination of response times. That is, because traffic management device 30 encounters all data flows transmitted to and from network 40, it can readily calculate the time network traffic spends traveling between a client and a server, the time used by the server, and the time spent on either side of traffic management device 30 itself.

Network traffic monitoring module 88, in one implementation, can make the following measurements or response time determinations:

1) total delay: The total time (in milliseconds) a transaction requires, beginning with a client's request and ending upon receipt of the response, corresponding to the end user's view of the time it takes for a transaction to complete.

2) network delay: The time (in milliseconds) spent in transit when a client and server exchange data. If a transaction requires a large quantity of data to be transferred, it is divided and sent in multiple packets. Network delay includes the transit time for all packets involved in a request-response transaction. The amount of time the server uses for processing a request is not included.

3) server delay: The time (in milliseconds) the server uses to process a client's request after it receives all required data. The server delay is the time after the server receives the last request packet and before it sends the first packet of response (not receipt acknowledgment, but actual response content). This is the time the server takes to process the client's request.

4) normalized network delay: The time (in milliseconds) per kilobyte spent in transit when a client and server exchange data. If a transaction requires a large quantity of data to be transferred, it is divided and sent in multiple packets. Because network delay increases as transaction size increases, it can be misleading when comparing times. Normalized network delay eliminates size as a factor to facilitate comparisons across flows and applications.

5) round trip time (RTT): The time (in milliseconds) spent in transit when a client and server exchange one small packet. Even if a transaction's data is split into multiple packets, RTT, includes only one round trip of a single packet between client and server.

6) Packet exchange time (PET): The time (in milliseconds) between a packet's departure from traffic management device and receipt of the corresponding acknowledgment. This metric reflects only the delay for the network on one side of traffic management device 30. U.S. application Ser. No. 09/710,442 discloses methods and systems for monitoring network delay on an application-level basis attributable to different networks by monitoring data flows at a demarcation point between the two networks.

In one implementation, traffic management device 30 can be configured to initiate synthetic web or other TCP transactions at periodic intervals to verify the availability of critical hosts and measure response times. This activity is similar to scheduled pings or SNMP polls, but has the added advantage of the functionality of network traffic monitoring module 88 being applied to analyze synthetic transaction behavior and response times, rendering the ability to profile network and host behavior over time.

A.5.a. Calculating Transit Delays

Figure 3:
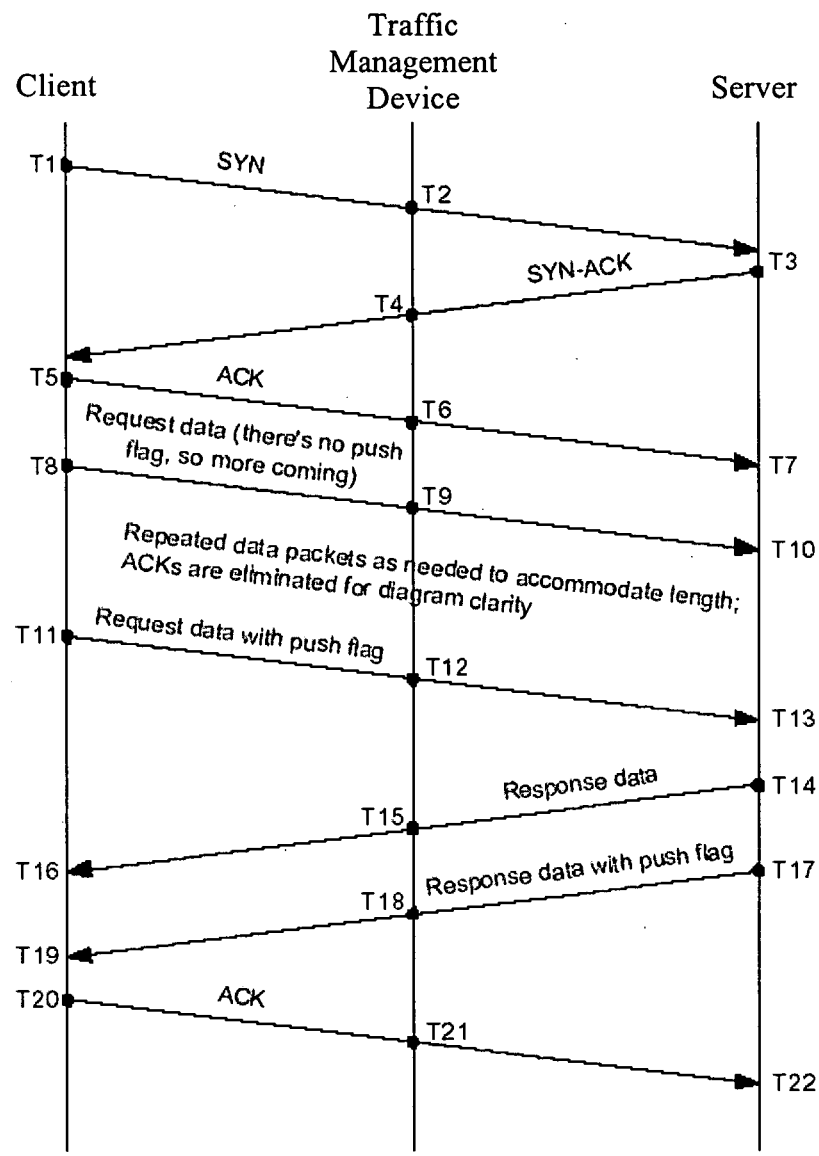
FIG. 3 is a TCP diagram illustrating the measurement of response times associated with TCP transactions.

To compute the delay measurements discussed above, network traffic monitoring module 88 tracks the course of a client-server transaction, making various packet arrival time and size observations, and uses information about a TCP connection to differentiate one portion of the exchange from another in order to compute accurate performance statistics. FIG. 3 illustrates the typical components associated with a TCP connection. FIG. 3 is a standard TCP diagram showing the course of a network transaction over time. Arrows indicate packets traveling the network between client and server. Time increases as one descends the diagram, with successive event times noted as TN, T1 representing the first event and T22, the last.

As FIG. 3 illustrates, a client initiates a server connection with a SYN at time T1. Network traffic monitoring module 88 notes the SYN at time T2 and forwards it along to the server. The server responds with a SYN-ACK at time T3. Network traffic monitoring module 88 notes the SYN-ACK at time T4, passing it along as shown. TCP stacks usually respond with a SYN-ACK very rapidly, within the kernel and with no context switches. The SYN-ACK follows the SYN almost immediately. Therefore, time T4 minus time T2 results in an accurate measure of the round-trip network delay between traffic management device 30 and the server. This interchange produces the first quantity, the server transit delay (STD):

$$STD = T4 - T2$$

The client receives the SYN-ACK and issues the final ACK of the three-way handshake at time T5. Network traffic monitoring module 88 notes the ACK at time T6, passing it along to the server. In one implementation, it is reasonably assumed that no processing transpires between the client's receipt of the SYN-ACK and its own corresponding ACK at time T5. Time T6 minus time T4 yields an accurate measure of the round-trip network delay between the client and traffic management device 30. The client transit delay (CTD):

$$CTD = T6 - T4$$

Putting together the server transit delay (STD) and the client transit delay (CTD) yields the total delay between the client and the server for a single round trip.

$$RTT(\text{Round-Trip Time}) = STD + CTD$$

A.5.b. Determining the Server Delay

The client initiates its request at time T8, arriving at the traffic management device 30 at time T9. For large requests, the request is divided into multiple packets. The TCP diagram of FIG. 3 eliminates the server's corresponding ACKs to simplify the picture, because these ACKs are not material to the calculations described herein. The last request packet, sent at time T11, has its Push Flag set to one indicating it is the final packet. Traffic management device 30 notes the time of this last request packet at T12. After the last request packet arrives at the server at time T13, the server assembles the request, conducts whatever processing is required for the request, and assembles its response. The server sends the first packet (of potentially several response packets) at time T14.

Time T14 minus time T13 is the actual server-processing time required for the request, but these times are not visible to network traffic monitoring module 88. However, network traffic monitoring module 88 knows that the server's processing time occurred after it saw the last request packet and before it saw the first response packet (time T15 minus time T12). Additionally, it knows that another component of this interval was the transit time from traffic management device 30 to the server and back again. Conveniently, it already has that figure—i.e., the server transit delay (STD). In addition, there is a small amount of time spent serializing the bits in the response packet and preparing them for their bit stream. This time was not included in the original server transit delay because the SYN and ACK packets are extremely small. Network traffic monitoring module 88, in one implementation, knows the size of the packet, calculates this preparation time accordingly ($\Delta 1$), and adds it to the STD before subtracting the sum from the time difference. Therefore, $$\text{Server Delay} = (T15 - T12) - (STD + \Delta 1)$$

A.5.c. Determining the Total Delay

The termination of a transaction, in certain implementations, is key to calculating the total delay; however, it is not always obvious when a transaction ends. The combination of a Push flag from the server and its corresponding ACK from the client frequently signal the end of a transaction. But long transactions often insert Push flags throughout the transaction. In addition to monitoring Push flags, network traffic monitoring module 88 uses a timer to track transactions and uses the following rules:

1) If a Push flag seems to indicate a transaction's end, but the server continues sending more data, the timer continues to advance.

2) If the client sends a new request, network traffic monitoring module 88 ends the last transaction and records the last time noted.

3) If there is no activity from either the server or the client, network traffic monitoring module 88 considers the transaction complete and records the last time noted.

4) When the connection ends, traffic management device 30 sees the FIN and records the last time noted.

Using these techniques, network traffic monitoring module 88 notes the last response packet at time T18, makes sure that it saw all required ACKs for the request packets, and verifies that the last response packet indeed represented the end of the transaction. After the client receives the final response packet at time T19, it sends an ACK. The ACK reaches traffic management device 30 at time T21. The client's perspective of response time starts with sending the first request packet (T8) and ends with receipt of the final response packet (T20). Network traffic monitoring module 88 sees that interval as time T9 to time T21. Although this is a close estimate of the client's view, it misses some extra preparation time for serializing the first request packet, assuming it is larger than the final ACK. Because network traffic monitoring module 88 knows the packet-size difference, however, it can calculate this small discrepancy ($\Delta 2$). Therefore, $$\text{Total delay} = (T21 - T9) + \Delta 2$$

A.5.d. Determining Network Delay

Once network traffic monitoring module 88 computes the server delay and the total delay, it can calculate the amount of time the transaction spent in transit.

$$\text{Network delay} = (\text{Total delay}) - (\text{Server delay})$$

Whereas the RTT represents the transit time for just one round trip, the network delay reflects all transit time for the transaction. If the transaction's data is large, multiple packets need to make their way to and from the server. Only the network delay reflects this overhead. The network delay is not necessarily an even multiple of the RTT because multiple packets are not sent consecutively but tend to overlap to varying degrees. In addition, because network and total delay are products of transaction size, ping times and RTM measurements are not comparable.

A.6. Network Traffic Monitoring Module

Network traffic monitoring module 88, as discussed above, analyzes network conditions or performance, and/or the performance of individual network applications, as part of a determination whether to increase bandwidth limits applied to data flows traversing access link 21. As discussed above, the network conditions can include current load, network congestion, average response times for all traffic classes, and the like. As discussed more fully below, network traffic monitoring module 88 may monitor the performance of selected network applications as part of the determination, in lieu of or in addition to monitoring aggregate network conditions. As discussed more fully below, another aspect of the determination is the costs associated with allowing data flows to consume additional bandwidth.

A.6.a. Aggregation and Analysis of Response Time Measurements

Network traffic monitoring module 88, in one implementation, collects packet arrival time observations and sizes, and computes response time measurements for the data flows and stores the computed measurement values in one process. A separate process accesses the stored values to analyze the performance of one or more network applications (or other traffic classes) in relation to one or more performance thresholds. Depending on the results of the analysis, this process can result in changes to the aggregate bandwidth limit applied to outbound and/or inbound data flows. Network traffic monitoring module 88, in one implementation, collects response time measurements associated with given traffic class identifiers, maintains the data in volatile memory for a given time interval (e.g., 1 minute), and then stores the data in non-volatile memory (similar to measurement engine 140). In another implementation, measurement engine 140 can be configured to store the relevant measurement variables. In another implementation, network traffic monitoring module 88 can average the response time measurements over the time interval and store the average response time measurements for each traffic class. Network traffic monitoring module 88 further includes APIs and associated functionality that aggregates raw response time measurement data over specified time intervals (e.g., the last hour, 15 minutes, day, etc.) on a traffic class or network-wide basis. A separate process, using these APIs, can compute average response times over desired intervals and compare these response times to pre-configured performance thresholds.

Traffic management device 30, in one embodiment, features a plug-in architecture that facilitates, among other things, updates to network traffic monitoring module 88 (as well as other) functionality. A plug-in can contain data that extends and/or modifies one or more tables or data structures used by network traffic monitoring module 88 and/or updated code. Network traffic monitoring module 88, in one embodiment, uses a shared (dynamic link) library loader to add analysis plug-ins to an existing software release during a boot sequence. The shared library loader, in one embodiment, is operative to determine whether any plug-ins exist (e.g., by checking a directory or other reserved file space), and to extend/modify tables or other data structures and/or register specific code as required. This plug-in architecture can be used to extend or modify how traffic monitoring module 88 analyzes application performance and adjusts the aggregate and other bandwidth limits.

In another embodiment, traffic management device 30 can be configured to include an embedded runtime environment 160 that is operative to execute network or application performance analysis scripts installed on traffic management device 30. Such an embodiment allows network administrators and others to create custom network or application performance analysis scripts tailored to a vast array of requirements, conditions and goals. In one embodiment, the embedded runtime environment is an object-oriented runtime environment, such as Python or Java®. The embedded runtime environment may be configured to include a runtime interpreter that interprets and executes scripts in source code form. In another embodiment, the embedded runtime environment may be configured to execute compiled application performance analysis scripts. In one such embodiment, the embedded runtime environment may include just-in-time compiler functionality to compile source code scripts into object or byte code form before execution.

As discussed more fully below, traffic management device 30 stores one or more network or application performance analysis scripts operative to determine whether the performance of the network, a given network application, or other traffic class complies with one or more threshold criteria. In one embodiment, performance analysis scripts are implemented as performance analysis objects, which are instantiations of performance analysis classes. In one embodiment, performance analysis objects can be instantiated for each traffic management device 30 and maintained such that the state of the performance analysis object can be pickled after execution to allow for certain data related to network or application performance analysis to persist. U.S. application Ser. No. 10/178,617, incorporated by reference herein, discloses the incorporation of embedded runtime environments into traffic management devices and the pickling of objects to persist data and variables.

In the following sections, didactic examples of scripts are provided that analyze bandwidth utilization relative to an applicable billing model and determine whether to modulate an aggregate bandwidth limit in response to increased network load. In other implementations, aggregate bandwidth limits may be modulated in response to degradation in the performance of a given traffic class. In the scripts provided below, increasing the aggregate bandwidth limit is referred to as bursting or allowing network traffic to burst up to a higher bandwidth utilization limit. In one embodiment, administrator interface 150 allows network administrators to select various traffic classes and configure a performance threshold (e.g., a threshold response time). In one implementation, when a network administrator selects this configuration option for a given traffic class, the corresponding traffic class identifier and the performance threshold are added to a dynamic configuration file. The performance analysis script or other functionality accesses this configuration file to determine for which traffic classes performance measurements should be analyzed. As the script provided below indicates, if the analyzed performance falls below the specified threshold for any given traffic class, the script analyzes bandwidth utilization relative to a billing model to determine the cost effects of use of additional link capacity. If use of additional link capacity is permitted, the bandwidth allocated to network traffic generally, or specific traffic classes, is increased. In one embodiment, this is accomplished by overwriting the partition parameters in traffic classification engine 86. In addition, once additional bandwidth is allocated, the script, in one implementation, operates to determine when to downgrade the bandwidth allocation to default levels.

A variety of implementations are possible. In one implementation, bandwidth allocation can be downgraded to default levels after some configured period of time after it was initially upgraded. For example, bandwidth allocation may be upgraded and automatically downgraded after 5 minutes (or other configurable period). If performance of the network generally, or a given traffic class, falls below an applicable threshold, it will again be upgraded upon a subsequent operation of the performance analysis functionality discussed above.

Since there are a variety of different strategies, and even different time intervals, that one could adopt for allowing bursting, one implementation encapsulates these strategies in several classes, which can then be sub-classed in various ways without changing the main program. In one implementation, the cost-aware, adaptive bandwidth management functionality includes a "traffic class evaluation" object that analyzes the performance associated with a given traffic class, and a "budget" object, which allows for different budgeting strategies. As set forth below, in one implementation, the main "traffic class evaluation" program calls the "considerUpgrade" or "considerDowngrade" method, without having to know what budgeting or class evaluation strategies are in place. This object-oriented programming technique allows for different traffic classes to have different strategies, and also allows network administrators to create custom strategy objects. In addition to the evaluation and budget modules, one implementation uses a "peak time" module, to encapsulate the concept of "peak periods" and "workdays." This allows a network administrator to specify an enterprise's holiday schedule and peak demand periods. Since allowing network traffic traversing an access link to burst may result in increase bandwidth charges, a network administrator, by specifying peak demand and holiday periods, can control when bandwidth limits are adjusted. Furthermore, as the scripts provided below demonstrate, one implementation of the present invention allows bursting to be "metered out" so that excess or essentially free bursting capabilities are not exhausted early in the billing cycle.

The implementation of the PeakTime module, shown below, assumes Monday to Friday workdays, and accepts a set of time intervals, in hours, which are the peak periods. The following is an example instantiation of the PeakTime object:

peaks=PeakTime.PeakTime([[9,12],[13,17]])

According to the instantiation of PeakTime above, the peak times are 9:00 am to 12:00 noon, and 1:00 pm to 5:00 pm. The following provides an implementation of the PeakTime object:

```
import calendar
from time import *
class PeakTime:
    """ This class encapsulates the notion of "peak time," or that part of
    the workday when performance is especially important. Each individual
    user can subclass this to match the enterprise's holidays and daily
    schedules.
    """
    def _init_(self, peakHours, weekdaysOnly = 1):
        """ periods is a list of 2-tuples, consisting of start time and
        end time.
        """
        self.peakHours = peakHours
        self.weekdaysOnly = weekdaysOnly
    def workdaysPerMonth(self, year, month):
        m = calendar.monthcalendar(year, month)
        count = 0
        for week in m:
            # count non-zero entries:
            if self.weekdaysOnly:
                r = range(0, 5)
            else:
                r = range(0, 7)
            for ix in r:
                if week[ix] > 0:
                    count += 1
        return count
```

```
    def workdaysLeftInMonth(self):
        tup = localtime(time( ))
        m = calendar.monthcalendar(tup[0], tup[1])
        count = 0
        # get the day of the month for today
        mday = tup [2]
        for week in m:
            # count non-zero entries:
            if self.weekdaysOnly:
                r = range(0, 5)
            else:
                r = range(0,7)
            for ix in r:
                if week[ix] >= mday:
                    count += 1
    return count
    def peakIntervalsPerDay(self, intervalLength):
        count = 0
        for period in self.peakHours:
            length = (period[1] - period[0]) * 60
            count += (length / intervalLength)
        return count
    def peakIntervalsPerMonth(self, intervalLength):
        tup = localtime(time( ))
        days = self.workdaysPerMonth(tup[0], tup[1])
        intervals = days * self.peakIntervalsPerDay(intervalLength)
        return intervals
    def nowIsPeak(self):
        tup = localtime(time( ))
        now = tup[3]
        for period in self.peakHours:
            if now >= period[0] and now < period[1]:
                return 1
    return None
```

As discussed above, the traffic class evaluation module encapsulates functions that evaluate whether to consider increasing the bandwidth utilized across access link 21 by a given traffic class. The following is the "abstract class" (or "superclass"), according to one implementation of the invention, for the traffic class evaluation module (ClassEval):

```
class ClassEval:
    """ The superclass. These are null implementations;
    Subclasses provide the details.
    """
    def _init_(self, className):
        self.className=className
        pass
    def considerUpgrade(self, cl):
        """ Since 'cl' is a native code object, which is only
        meaningful at runtime, it is not pickled. Therefore, it
        is passed in as an argument, and the ClassEval does
        not save it as an instance variable (otherwise the pickling
        machinery tries to process it)
        """
        return None
    def considerDowngrade(self, cl):
        """ See comments for considerUpgrade.
        """
        return None
```

The following is an implementation of ClassEval, which uses the packet exchange time (PET) variable for the last 15 minutes to determine whether performance associated with a given traffic class is acceptable:

```
import ClassEval
import time
import Percentiles
class ClassEvalSimple(ClassEval.ClassEval):
    """ This eval class tests pkt_exch_time for the last 15
    minutes, against a fixed threshold.
    """
```

```
def _init_(self, name, threshold, evalTime, upgradeRe-
    EvalTime, \ downgradeTime):
    ClassEval.ClassEval._init_(self, name)
    self.threshold=threshold
    self.evalTime=evalTime
    self.upgradeReEvalTime=upgradeReEvalTime
    self.downgradeTime=downgradeTime
    self.timeDowngraded=0
    self.timeLastEval=0
def evalThreshold(self, cl):
    now=time.time( )
    self.timeLastEval=now
    if                          cl.ME.pkt_exch_time.last_
        15_minutes>self.threshold: self.timeUpgraded=now
        return 1
    return None
def considerUpgrade(self, cl):
    """ Rules:
    1) if traffic class already downgraded again, then
       recheck its performance sooner than normal interval.
    2) if not, then check it at the regular interval
    """
    now=time.time( )
    if self.downgradeTime>0:
        if                                          now-
            self.downgradeTime>self.upgradeReEvalTime:
            return self.evalThreshold(cl)
    if now-self.timeLastEval>self.evalTime:
        return self.evalThreshold(cl)
    return None
def considerDowngrade(self, cl):
    """ In this version, the method tries downgrading every
    configured interval. Other subclasses could increase
    the interval after an unsuccessful downgrade, or learn
    from history.
    """
    now=time.time( )
    if now-self.timeUpgraded>self.downgradeTime:
        return 1
    return None
```

As discussed above, a separate budget module monitors bandwidth utilization relative to a billing model to monitor costs, which in one implementation is another component in determining whether to allow bursting. The following is one implementation of the superclass for Budget:

```
class Budget:
    """ The base class for an object which monitors the budget
    in relation to a given billing model.
    """
    def _init_(self):
        pass
    def update(self, criticalClasses):
        pass
    def allowBursting(self):
        return 0
    def stopBursting(self):
        return 1
```

As set forth below, traffic management device 30 can compute bandwidth usage based on observations internal to it (by polling measurement engine 40 and/or network traffic monitoring module 88), or poll (via SNMP query) a network device associated with a network service provider to obtain bandwidth utilization statistics used to compute charges for access link 21. The following provides one possible implementation of the Budget class:

```
import Budget
from time import *
import calendar
def daysThisMonth( ):
    tup = localtime(time( ))
    month = tup[1]
    days = calendar.mdays[month]
    if month == 1: # February
        if calendar.isleap[tup[0]]:
            days = 29
    return days
class Percentiles(Budget.Budget):
    """ This class keeps the percentiles of avg-bps for an entire
    month (or other billing cycle). 'interval' is the granularity with
    which the network service provider measures it.
    One implementation keeps every sample in a list,
    and keeps the list sorted.
    If snmpQuery objects are given, the class uses them to query the
    network service provider's routers to get a (presumably) more accurate
    estimate of avg-bps, since it comes from the carrier itself.
    """
    def _init_(self, partName, interval, burstLimitNormal,
            burstLimitExtra, \
            maxBurstIntervals, peakPeriods = None, snmpQuery = None):
        if interval ! = 1 and interval ! = 15:
            raise RuntimeError("Bad interval")
        self.interval = interval
        self.className = partName
        self.burstLimitNormal = burstLimitNormal
        self.burstLimitExtra = burstLimitExtra
        self.peakPeriods = peakPeriods
        self.snmpQuery = snmpQuery
        self.maxBurstIntervals = maxBurstIntervals
        self.zeroNumbers( )
    def zeroBurstCounts(self):
        self.burstThisMonth = 0
        self.dayStartedBursting = 0
        self.burstToday = 0
    def zeroNumbers(self):
        self.vals = [ ]
        self.samplesThisMonth = 0
        self.month = localtime(time( )) [1]
        self.ninetyFifth = 0
        self.maxIntervalsThisMonth =
            self.peakPeriods.peakIntervalsPerMonth(self.interval)
        self.zeroBurstCounts( )
    def update(self, cl):
        """ 'cl' is a way of passing us the native code object,
        which is runtime state and thus does not get pickled with this
        object.
        """
        # if the month's rolled over, zero everything:
        if localtime(time( )) [1] != self.month:
            self.zeroNumbers( )
        newAvgBps = None
        # if snmpQuery object available, try it:
        if self.snmpQuery:
            newAvgBps = self.snmpQuery.eval( )
        if newAvgBps == None:
            if self.interval == 1:
                newAvgBps = cl.ME.avg_bps.last_minute
            else:
                newAvgBps = cl.ME.avg_bps.last_15_minutes
        # see if this was, in fact, an interval when bursting allowed
        if newAvgBps > self.burstLimitNormal:
            self.burstThisMonth += 1
            self.burstToday += 1
        self.vals.append(newAvgBps)
        self.vals.sort( )
        # since the list is in sorted order, percentiles are easy
        ix95= int(self.samplesThisMonth * 0.95)
        self.ninetyFifth = self.vals[ix95]
    def allowBursting(self):
        mday = localtime(time( )) [2]
        # if not in a peak period, exit:
        if not self.peakPeriods.nowIsPeak( ):
            return 0
        # if free capacity available, or if budget allows, do it
        if self.ninetyFifth < self.burstLimitNormal or \
            self.burstThisMonth < maxBurstIntervals:
```

-continued

```
    # record the day process started, and how many intervals to
    allow today
    self.intervalsToBurstToday = \
        self.peakPeriods.workdaysLeftInMonth( ) * \
        self.peakPeriods.peakIntervalsPerDay(self.interval)
    self.zeroBurstCounts( )
    return 1
    return 0
def stopBursting(self):
    # if the day has flipped over, stop.
    mday = localtime(time( )) [2]
    if self.dayStartedBursting != mday:
        self.zeroBurstCounts( )
        return 1
    if self.burstToday >= self.intervalsToBurstToday:
        self.zeroBurstCounts( )
        return 1
    # Or if not in a peak period, stop bursting:
    if not self.peakPeriods.nowIsPeak( ):
        self.zeroBurstCounts( )
        return 1
    # if free bursting possible, don't stop bursting
    if self.ninetyFifth < self.burstLimitNormal:
        return 0
    # if monthly allotment is used up, stop
    if self.burstThisMonth >= self.maxBurstIntervals:
        self.zeroBurstCounts( )
        return 1
    return 0
```

As the foregoing illustrates, the Percentiles Budget object, set forth above, is configured with a number of parameters, including:

- The name of the partition (part Name) which may be allowed to burst;
- The time interval (in minutes) on which the network service provider measures bandwidth usage, usually 1 or 15 minutes;
- The "normal" burst limit for the partition;
- The "extra" limit—i.e., the maximum bandwidth when bursting is allowed;
- The maximum number of intervals per month to allow the partition to burst up to the extra limit;
- A PeakTime object informing when we are in a peak period and should consider bursting, as discussed above; and
- Optionally, an SNMPQuery object which can query the network service providers router and get the carrier's own monitored values.

The Percentiles object, in one implementation, can be supplied with an 'snmpQuery' object (not shown), which is capable of querying an IP address for a given MIB object (OID). This OID is presumed to be the cumulative 'bytes' transferred on the link in question. Each minute, or 15 minutes (whichever is the carrier's billing policy), the snmpQuery object will fetch the cumulative 'bytes' and use it to compute the average bits per second over the last period. In typical cases, the usual practice in SNMP is that numbers are cumulative. Accordingly, obtaining the total over any an interval for a given MIB variable requires sampling at each interval and subtracting the current value from the previously sampled value. However, since it is possible that the vagaries of timing could make measuring any particular period impossible or inaccurate, the Percentiles object is also capable of querying measurement engine 140 and/or application traffic monitoring module 88 as a backup.

According to the billing model implemented in the budget class, the $95^{th}$ percentile of the avg-bps values for access link 21 yields the expected cost for the billing cycle. Maintaining the avg-bps values for the billing cycle also provides an accurate indicator of how much bursting over the normal aggregate bandwidth limit has actually occurred (regardless of how often traffic management device 30 has allowed bursting). Obtaining a percentile such as median or $95^{th}$ accurately, in statistical theory, requires all the samples. In the implementation described above, the Budget class accomplishes this by adding each avg-bps measurement in a list, and sorting it:

```
    self.vals.append(newAvgBps)
    self.vals.sort( )
    self.samplesThisMonth+=1
    # since the list is in order, percentiles are easy
    ix95=int(self.samplesThisMonth*0.95)
    self.ninetyFifth=self.vals[ix95]
```

Other sorting schemes (e.g. balanced binary trees) are also possible.

A.6.b. Allow Bursting (Increasing Bandwidth Limits)

To summarize the foregoing, the Budget module executes a number of cost-aware operations when deciding whether to allow bursting. However, the ClassEval object may nevertheless decide that bursting is not necessary since the observed performance levels associated with the traffic class are acceptable. As the following illustrates, the Budget module determines whether the current time is within a peak period where bursting is allowed. In addition, if the $95^{th}$ percentile of bandwidth usage is less than the target (i.e. we can get some free burst time), or the maximum burst intervals per month have not been exhausted, the Budget module allows bursting. In this case, the Budget module determines how many work days remain in the billing cycle and allocates the correct fraction of that time for bursting in the current day.

```
def allowBursting(self):
    mday=localtime(time( )[2]
    # if we're not in a peak period, exit:
    if not self.peakPeriods.nowIsPeak( )
        return 0
    # if we can grab some free time, or if budget allows, to it
    if self.ninetyFifth<self.burstLimitNormal or \
        self.burstThisMonth<maxBurstIntervals:
        # record the day we started this, and how many intervals
            to allow today
        self.intervalsToBurstToday=\
            self.peakPeriods.workdaysLeftInMonth( )*\
            self.peakPeriods.peakIntervalsPerDay(self.interval)
        self.zeroBurstCounts( )
        return 1
    return 0
```

A.6.c. Stop Bursting

As the Budget module set forth above illustrates, after bursting is allowed, another process determines when to stop bursting and apply the normal bandwidth utilization limit that achieves the desired cost objective. The following code sections illustrate the actions taken in determining whether to stop bursting. Although other considerations can be applied, this determination in the implementation shown is made on the basis of cost and budget.

```
def stopBursting(self):
    # if the day has flipped over, stop.
    mday=localtime(time( )[2]
    if self.dayStartedBursting !=mday:
        self.zeroBurstCounts( )
        return 1
    if self.burstToday>=self.intervalsToBurstToday:
        self.zeroBurstCounts( )
        return 1
    # Or if not in a peak period, stop bursting:
    if not self.peakPeriods.nowIsPeak( ):
        self.zeroBurstCounts( )
        return 1
```

```
# if free bursting still available, don't stop bursting
    if self.ninetyFifth<self.burstLimitNormal:
        return 0
    # if monthly allotment exhausted, stop
    if self.burstThisMonth>=self.maxBurstIntervals:
        self.zeroBurstCounts( )
        return 1
    return 0
```

As the foregoing illustrates, since bursting is metered out on a daily basis, the Budget module stops each day at midnight. Similarly, if the peak period has ended, the Budget module ceases bursting, and returns to normal bandwidth limits. In addition, if the maximum number of bursting periods in the day, or for the entire billing cycle, has been exhausted, bursting is also stopped. However, if the $95^{th}$ percentile of the monitored bandwidth usage is within the limits defined by the desired cost objective, bursting is allowed to proceed.

A.6.d. Main Program

The following provides a main program, according to one implementation of the present invention, executed in embedded runtime environment 160. The implementation described below takes advantage of the state pickling machinery of embedded runtime environment to maintain the state of one or more parameters. As the code set forth below demonstrates, the main program first analyzes the performance associated with a given traffic class before determining whether the budget allows bursting. The script described herein operates to optimize network or application performance, while maintaining bandwidth costs within a desired cost objective. As one skilled in the art will recognize, other scripts can be written that treat the cost objective as an additional, not-necessarily limiting factor in the decision to allow bursting at a given time. For example, both cost and application performance could be weighted or non-weighted factors in bursting decision function. The main program can optimize this utility function with the results of the optimization yielding determining whether to allow bursting.

```
import sys
import PacketWiseObject
import cPickle
import ps_cmd
import time
import ClassEval
"""
Theory of operation for this example:
All these objects are pickled, so that current state can be maintained
across invocations:
partitions: a dictionary of partition names.
    Each is in turn a dictionary, consisting of:
    "classes" : a list of ClassEval objects
    "burstLimitNormal" : the normal bandwidth limit for the partition
    "burstLimitExtra" : the limit to which the
        partition is allowed to burst, when necessary
    "budget" : a Budget object for that partition
    burstingPartitions: a dictionary of the partitions which are currently
        allowed to burst.
"""
# "permanent" state:
state = { }
# "runtime" state: contains the objects which are only meaningful while
# the traffic management device is running (and thus, can't be pickled)
criticalClasses = { }
criticalPartitions = { }
burstingPartitions = { }
def writeState(fileName):
    f = open(fileName, 'w')
    cPickle.dump(state, f)
    f.close( )
```

```
def readState(fileName):
    global state
    global criticalClasses
    global fastLinkClasses
    f = open(fileName, 'r')
    state = cPickle.load(f)
    f.close( )
    # create the runtime objects for all referenced traffic classes, and
    # save their eval objects in them
    for partName in state['partitions'].keys( ):
        partRecord = state['partitions'] [partName]
        cl = PacketWiseObject.TClassObject(partName)
        cl.partName = partName
        cl.burstLimitNormal = partRecord['burstLimitNormal']
        cl.burstLimitExtra = partRecord['burstLimitExtra']
        criticalPartitions[partName] = cl
        # attach the budget object to it
        cl.budget = partRecord['budget']
        for eval in partRecord['classes']:
            cl = PacketWiseObject.TClassObject(eval.className)
            criticalClasses[partName] = cl
            cl.eval = eval
            cl.burstLimitNormal = partRecord['burstLimitNormal']
            cl.burstLimitExtra = partRecord['burstLimitExtra']
            # finally, attach the partition name
            cl.partName = partName
def initialize(fileName, partitions):
    """
    create the pickled file for the first time
    """
    global state
    state['partitions'] = partitions
    writeState(fileName)
    readState(fileName) # to set up internal data structures
def upgrade(cl):
    # actually do the upgrade
    cmd = "partition remove " + cl.partName
    ps_cmd.issueCmd(cmd)
    cmd = "partition apply %s %d %d" % (cl.partName,
            cl.burstLimitNormal, \ cl.burstLimitExtra)
    ps_cmd.issueCmd(cmd)
    return None
def downgrade(cl):
    # actually do the downgrade
    cmd = "partition remove " + cl.partName
    ps_cmd.issueCmd(cmd)
    cmd = "partition apply %s %d fixed" % (cl.partName,
cl.burstLimitNormal)
    ps_cmd.issueCmd(cmd)
    return None
def considerUpgrades( ):
    global state
    global criticalClasses
    global burstingPartitions
    # first, update data for all the partitions (usually 1 or 2)
    for partName in criticalPartitions.keys( ):
        print "considering upgrading " + partName
        cl = criticalPartitions[partName]
        cl.budget.update(cl)
    for className in criticalClasses.keys( ):
        cl = criticalClasses[className]
        clPart = criticalPartitions[cl.partName]
        # if already bursting, go on to the next
        if burstingPartitions.has_key(cl.partName):
            continue
        # if performance is OK, don't bother
        if not cl.eval.considerUpgrade(cl):
            continue
        # if the budget doesn't allow it, stop here:
        if not clPart.budget.allowBursting( ):
            continue
        upgrade(clPart)
        # remember actions
        burstingPartitions[clPart.className] = clPart
def considerDowngrades( ):
    global state
    global criticalClasses
    global burstingPartitions
    # first, update data for all the partitions (usually 1 or 2)
    for partName in criticalPartitions.keys( ):
```

-continued

```
    print "considering upgrading " + partName
    cl = criticalPartitions[partName]
    cl.budget.update(cl)
for className in criticalClasses.keys( ):
    cl = criticalClasses[className]
    clPart = criticalPartitions[cl.partName]
    # if not already bursting, go on to the next
    if not burstingPartitions.has_key(cl.partName):
        continue
    # if the budget wants to stop it, do so:
    if clPart.budget.stopBursting( ):
        downgrade(clPart)
        del burstingPartitions[clPart.className]
        continue
    if cl.eval.considerDowngrade(cl):
        downgrade(clPart)
        del burstingPartitions[clPart.className]
```

A.7. Operation

FIG. 4 illustrates a method, according to an embodiment of the present invention, directed to a flow-aware process that receives incoming flows, classifies them, and applies one or more traffic policies based on the identified traffic class. As FIG. 4 illustrates, a packet processor 82 receives a data packet (202) and determines whether a flow object has already been created for the flow to which the data packet is a part (204). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (206). Packet processor 82 then determines whether the received packet is part of an existing flow or a new data flow (208). In typical network deployments, flows are generally TCP or UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "Next-Header" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (210). For example, the packet processor 82, in one embodiment, increments the packet count associated with the flow, as well as the last packet time. If the packet represents a new data flow, traffic classification database 86 operates on the flow object and, potentially, attributes of the packet and other packets associated with the flow to determine a traffic type and/or traffic class associated with the flow (214). In one embodiment, the packet (or a pointer to the packet stored in a buffer structure) and the flow object (or a pointer thereto) is passed to the traffic classification database 86 to determine a traffic class. As discussed herein, identification of a traffic class or type can employ information gleaned from Layers 2 thru 7 of the OSI reference model. The determination of traffic classes is discussed in more detail in Section A.1. and A.2., above. Similarly, if the packet represents a change to the data flow (212), packet processor 82 passes the packet and flow object to the traffic classification database 86 to determine the traffic class. Methods for determining changes to data flows are also well known in the art. For example, an email may include an attached digital image file. Accordingly, while the initial packets in the data flow may include simple text data, subsequent packets may contain image data. Packet processor 82, in one embodiment, is operative to detect such changes in the characteristics of the data flow by examining data encapsulated in upper layers of each packet, such as the detection of MIME types, etc.

As discussed above, to identify a traffic class associated with the data flow, packet processor 82 passes the flow object (or a pointer to the control block object) to traffic classification database 86. In one embodiment, the control block object or a copy of it is stored in association with the packet and in the same buffer structure to facilitate access to the control block object by traffic classification database 86. As discussed in more detail below, traffic classification database 86 operates on attributes of the flow object, (and potentially on the packet stored in the buffer structure) to identify traffic class(es) associated with the data flow (214). In one embodiment, the flow object includes a pointer to the identified traffic class(es) in traffic classification database 86. In one embodiment, the traffic classification database 86 stores in the flow object the traffic management policy parameters (e.g., policy parameters, partition parameters, etc.), if any, associated with the identified traffic classes (216).

Packet processor 82 then passes the packet to flow control module 84 (222) which accesses the flow object corresponding to the data flow to retrieve differentiated service policies, if any, associated with the traffic class and enforces the identified traffic policy(ies) on the data packet flow. As FIG. 4 illustrates, measurement engine 140 also records or updates various measurement values associated with the packet to allow for analysis of bandwidth utilization and other network statistics on a traffic class or aggregate basis by traffic monitoring module 88.

As discussed above, the performance analysis functionality discussed above monitors, in a separate process, the conditions associated with, and/or the performance of the network (e.g., network delays, loading conditions, efficiency, etc.), or network applications, and bandwidth utilization costs and other budget-related factors to determine whether to increase bandwidth limits (i.e. allowing bursting to a higher limit). To increase bandwidth limits, network traffic monitoring module 88 maintains the appropriate partition parameters in traffic classification database 86, depending on the analyzed performance, or other network conditions, of the network or network applications. For example, and referring to FIG. 6, the root /inbound and /outbound partitions may be set to the available capacity of the access link 21, while child partitions configured for the "High_Priority" traffic classes may be limited to a default amount (e.g., 6 Mbps) to meet a desired cost objective. For example, a first partition may be created for the /Other_Traffic class limiting bandwidth utilization to 2 Mbps, while a second partition may be created for the /High_Priority class limiting bandwidth utilization by default to 4 Mbps. When a bursting condition is met as to any child traffic class of the High_Priority class, the /High_Priority partition, for example, may be configured to burst up to available capacity of the access link 21 (e.g., 45 Mbps) for a period of time before being reset to the default limit. In other implementations, each child traffic class of the High_Priority class may be configured with its own partition (limiting bandwidth to 1 Mbps, for example), and allowed to burst up to the available capacity of the access link 21 or some other increased bandwidth limit. In the implementation described above, however, the /High_Priority traffic class is configured with a burstable partition that is allowed to burst up to the root /Inbound or /Outbound partition. To allow data flows corresponding to the /High_Priority traffic class to consume additional bandwidth, the aggregate bandwidth limit of the root /Inbound or /Outbound partition is increased.

Lastly, although the present invention has been described as operating in connection with end systems and networks primarily employing the HTTP, TCP and IP protocols, the present invention has application in computer network environments employing any suitable session layer, transport layer and network layer protocols. In addition, the billing model discussed above is based on the 95$^{th}$ percentile average bandwidth utilization sample over the billing cycle. As one skilled in the art will recognize, the Budget modules and classes discussed above can be tailored to a variety of other billing models. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method in a computer network comprising an access link, wherein monetary charges incurred for utilization of the access link are based on a billing model, the method comprising:
    applying an aggregate bandwidth limit to data flows traversing the access link;
    monitoring data throughput of the access link relative to the billing model, wherein the billing model defines the monetary charges incurred based on the data throughput;
    modulating the aggregate bandwidth limit to maximize performance of a network application against a desired cost level of the access link based on the billing model and the data throughput, wherein the modulating comprises:
        determining an incremental cost of raising the aggregate bandwidth limit, the incremental cost defined by a pricing model included in the billing model; and
        based on the incremental cost, raising the aggregate bandwidth limit; and
    monitoring the performance of the network application, wherein the network application transfers packets between a first set of hosts and a second set of hosts over the computer network, including monitoring of response times between at least one host in the first set and at least one host in the second set, wherein the monitoring of the response times includes:
        recording, at a network device disposed between the first set of hosts and the second set of hosts, arrival times of the packets associated with the network application; and
        computing, based on the arrival times of the packets, at least one parameter characterizing a response time between at least one host in the first set and at least one host in the second set.

2. The method of claim 1, further comprising:
    computing a cost for the access link based on the data throughput and the billing model, wherein the modulating step is conditioned on the performance of the network application and the cost computed for the access link.

3. The method of claim 1, wherein the monitoring the performance of the network application comprises monitoring a packet exchange time (PET) observed over the computer network.

4. The method of claim 1, wherein the monitoring the performance of the network application comprises measuring network delay attributable to the computer network.

5. The method of claim 1, wherein the modulating the aggregate bandwidth limit comprises modulating a class bandwidth limit applied to data flows matching a selected traffic class.

6. A method in a computer network comprising an access link, wherein monetary charges incurred for utilization of the access link are based on a billing model, the method comprising:
    applying an aggregate bandwidth limit to data flows traversing the access link;
    monitoring usage of the access link relative to the billing model;
    modulating the aggregate bandwidth limit to maximize performance of a network application and minimize a cost of the access link based on the billing model, wherein the modulating comprises:
        determining an incremental cost of raising the aggregate bandwidth limit, the incremental cost defined by a pricing model included in the billing model; and
        based on the incremental cost, raising the aggregate bandwidth limit; and
    monitoring the performance of the network application, wherein the network application transfers packets between a first set of hosts and a second set of hosts over the computer network, including monitoring of response times between at least one host in the first set and at least one host in the second set, wherein the monitoring of the response times includes:
        recording, at a network device disposed between the first set of hosts and the second set of hosts, arrival times of the packets associated with the network application; and
        computing, based on the arrival times of the packets, at least one parameter characterizing a response time between at least one host in the first set and at least one host in the second set.

7. The method of claim 6, further comprising:
    computing a cost for the access link based on the usage of the access link and the billing model, wherein the modulating step is conditioned on the performance of the network application and the cost computed for the access link.

8. The method of claim 6, wherein the monitoring the performance of the network application comprises monitoring a packet exchange time (PET) observed over the computer network.

9. The method of claim 6, wherein the monitoring the performance of the network application comprises measuring network delay attributable to the computer network.

10. The method of claim 6, wherein the modulating the aggregate bandwidth limit comprises modulating a class bandwidth limit applied to data flows matching a selected traffic class.

11. A method in a computer network comprising an access link, wherein monetary charges incurred for utilization of the access link are based on a billing model, the method comprising:
applying a default bandwidth limit to data flows traversing the access link, wherein the default bandwidth limit is less than an available capacity of the access link;
monitoring usage of the access link relative to the billing model to compute an access link cost;
monitoring a performance attribute of the access link, including:
monitoring performance of a network application, wherein the network application transfers packets between a first set of hosts and a second set of hosts over the computer network, further including monitoring of response times between at least one host in the first set and at least one host in the second set, wherein the monitoring of the response times includes:
recording, at a network device disposed between the first set of hosts and the second set of hosts, arrival times of the packets associated with the network application; and
computing, based on the arrival times of the packets, at least one parameter characterizing a response time between at least one host in the first set and at least one host in the second set; and
determining whether to apply a second bandwidth limit to data flows traversing the access link based on the access link cost and the performance attribute, wherein the second bandwidth limit is greater than the default bandwidth limit, and wherein determining whether to apply the second bandwidth limit comprises:
determining an incremental cost of applying the second bandwidth limit, the incremental cost defined by a pricing model included in the billing model; and
based on the incremental cost, applying the second bandwidth limit.

12. The method of claim 11, wherein the monitoring of the performance attribute of the access link comprises monitoring a packet exchange time (PET) observed over the computer network.

13. The method of claim 11, wherein the monitoring of the performance attribute comprises measuring network delay attributable to the computer network.

14. The method of claim 11, wherein the second bandwidth limit is the available capacity of the access link.

15. The method of claim 11 wherein usage of additional bandwidth in excess of the first bandwidth limit is restricted to data flows corresponding to selected network applications.

16. An apparatus facilitating management of bandwidth utilization costs, comprising:
a packet processor; and a memory coupled to the packet processor to:
detect data flows in network traffic traversing a communications path, the data flows each comprising at least one packet; and
parse at least one packet associated with a data flow into a flow specification;
a traffic classification database operative to:
store at least one traffic class including a traffic class identifier and at least one attribute defining the traffic class; and
compare attributes stored in association with traffic class identifiers to attributes of a data flow to match a traffic class that corresponds to the data flow;
an application performance monitoring module to:
monitor the performance of at least one traffic class by maintaining at least one measurement parameter characterizing transfer of packets between a first set of hosts and a second set of hosts over the computer network;
a traffic policy module to:
apply an aggregate bandwidth limit to data flows traversing an access link; and
wherein the apparatus is to
monitor bandwidth utilization of the access link relative to a billing model associated with the access link;
compute a cost level based on the billing model and the monitored bandwidth utilization;
modulate the aggregate bandwidth limit to maximize network application performance against a desired cost level of the access link based on the billing model and the monitored data throughput, wherein modulating the aggregate bandwidth limit comprises:
determining an incremental cost of raising the aggregate bandwidth limit, the incremental cost defined by a pricing model included in the billing model; and
based on the incremental cost, raising the aggregate bandwidth limit; and
monitor performance of a network application, wherein the network application transfers packets between the first set of hosts and the second set of hosts over the computer network, including monitoring of response times between at least one host in the first set and at least one host in the second set, wherein the monitoring of the response times includes:
recording arrival times of the packets associated with the network application; and
computing, based on the arrival times of the packets, at least one parameter characterizing a response time between at least one host in the first set and at least one host in the second set.

17. The apparatus of claim 16, wherein the traffic classification database is further to store a default aggregate bandwidth limit in association with at least one traffic class; wherein the traffic policy module is to apply the default aggregate bandwidth limit to data flows corresponding to a given traffic class with a corresponding service level in the traffic classification database; and wherein the apparatus is to increase the aggregate bandwidth limits applied to data flows corresponding to a given traffic class in response to the monitored performance of the given traffic class.

18. The apparatus of claim 16 wherein the packet processor is further to:
parse at least one packet associated with the flow into a flow specification, wherein the flow specification contains at least one specification selected from: a protocol family designation, a direction of packet flow designation, a protocol type designation, a pair of hosts, a pair of ports, a pointer to a MIME type a pointer to an application-specific attribute.

19. The apparatus of claim 18 wherein the traffic classification database is to:
match the flow specification to a plurality of traffic classes, each of the traffic classes defined by one or more matching attributes; and responsive to finding a traffic class in the plurality of traffic classes matching the flow specification, associate the flow specification with the traffic class.

20. The apparatus of claim 16 further comprising an embedded runtime environment to execute at least one script module, the at least one script module to:
monitor bandwidth utilization of the access link relative to the billing model; and
modulate the aggregate bandwidth limit to maximize network application performance against the desired cost level of the access link.

* * * * *